(12) United States Patent
Nakai et al.

(10) Patent No.: US 7,643,397 B2
(45) Date of Patent: Jan. 5, 2010

(54) PHASE-CHANGE OPTICAL RECORDING MEDIA AND OPTICAL RECORDING-REPRODUCING APPARATUS

(75) Inventors: Tsukasa Nakai, Hino (JP); Yasuaki Ootera, Kawasaki (JP); Sumio Ashida, Yokohama (JP); Keiichiro Yusu, Yokohama (JP); Nobuhisa Yoshida, Kamakura (JP); Koji Takazawa, Tokyo (JP); Naomasa Nakamura, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 672 days.

(21) Appl. No.: 11/224,097

(22) Filed: Sep. 13, 2005

(65) Prior Publication Data
US 2006/0077878 A1   Apr. 13, 2006

(30) Foreign Application Priority Data
Sep. 29, 2004   (JP)   ............................. 2004-285444

(51) Int. Cl.
*H04B 1/56* (2006.01)
*H04B 3/40* (2006.01)

(52) U.S. Cl. .................................. 369/275.1; 369/283

(58) Field of Classification Search .............. 369/275.1, 369/283
See application file for complete search history.

(56) References Cited

U.S. PATENT DOCUMENTS

| | | | | |
|---|---|---|---|---|
| 5,191,565 | A * | 3/1993 | Inoue et al. | 369/284 |
| 5,764,619 | A * | 6/1998 | Nishiuchi et al. | 369/275.1 |
| 6,670,014 | B2 * | 12/2003 | Nishihara et al. | 428/64.1 |
| 6,839,306 | B1 * | 1/2005 | Hajjar | 369/13.33 |
| 7,455,951 | B2 | 11/2008 | Ichihara et al. | |

| | | |
|---|---|---|
| 2006/0077869 A1 | 4/2006 | Yusu et al. |
| 2006/0291370 A1 | 12/2006 | Nakai et al. |
| 2007/0178272 A1 | 8/2007 | Nakai et al. |
| 2007/0248785 A1 | 10/2007 | Nakai et al. |

FOREIGN PATENT DOCUMENTS

| | | |
|---|---|---|
| JP | 4-301226 | 10/1992 |
| JP | 9-102150 | 4/1997 |
| JP | 9-293271 | 11/1997 |
| JP | 2000-322770 | 11/2000 |
| JP | 2004-178673 | 6/2004 |
| WO | WO 02/31825 | 4/2002 |

OTHER PUBLICATIONS

Tetsuya Iida, et al. "Next Generation High Density ROM Type Optical Disk", Technical Report of the Institute of Electronics, Information and Communication Engineers, CPM 2000-96, Sep. 2000, pp. 29-34.

(Continued)

*Primary Examiner*—Joseph H Feild
*Assistant Examiner*—Nicholas Lee
(74) *Attorney, Agent, or Firm*—Oblon, Spivak, McClelland, Maier & Neustadt, L.L.P.

(57) ABSTRACT

The present invention relates to an optical recording media including two or more information layers, at least one of the information layers including a writable recording film. In the optical recording media, at least one information layer has protrusions and recesses that permit tracking and at least another one information layer is substantially flat.

9 Claims, 5 Drawing Sheets

OTHER PUBLICATIONS

M. Kuwahara, et al., "thermal Original of Readout Mechanism on Super Resolution Near-Field Structure Disk—Appearance of super resolutional readout by thermal effect," Technical Report of IEICE, the Institute of Electronics, Information and Communication Engineers, Mar. 2004, Chapter 3.1.

J. Tominaga et al., "Principle of Super Lens and the Progress," Technical Report of IEICE, the Institute of Electronics, Information and Communication Engineers, Sep. 1999, Fig 3.3.

* cited by examiner

PHASE-CHANGE OPTICAL RECORDING MEDIA AND OPTICAL RECORDING-REPRODUCING APPARATUS

CROSS-REFERENCE TO RELATED APPLICATIONS

This application is based upon and claims the benefit of priority from prior Japanese Patent Application No. 2004-285444, filed Sep. 29, 2004, the entire contents of which are incorporated herein by reference.

BACKGROUND OF THE INVENTION

1. Field of the Invention

The present invention relates to an optical recording media comprising information layers stacked in the light incident direction, at least one of the information layers including a rewritable recording film or a write-once recording film, and also relates to an optical recording-reproducing apparatus recording to and reproducing from the optical recording media.

2. Description of the Related Art (Principle of Phase-change Optical Recording Media)

The phase-change optical recording media, which uses a phase-change optical recording film that brings about reversible phase change between the crystalline and amorphous phases by irradiation with a light beam, operates according to the following principle. Recording is performed by heating the region irradiated with a light beam to temperatures higher than the melting point of the film so as to melt that region, followed by rapidly cooling the molten region so as to change atomic arrangement in the cooled region to form an amorphous phase. Erasure is performed by retaining the temperature of a region irradiated with a light beam for at least a prescribed time such that the temperature falls within a range between a level not higher than the melting point and not lower than the crystallizing temperature. In this stage, in the case where the initial state is crystalline, the crystalline phase is maintained, and in the case where the initial state is amorphous, the amorphous phase is changed into the crystalline phase. Reading is performed by converting the intensity of the reflected light into the intensity of an electrical signal by utilizing the phenomenon that the intensity of the reflected light from the amorphous region differs from the intensity of the reflected light from the crystalline region, followed by subjecting the electrical signal to analog-to-digital conversion. In reading, it is also possible to utilize phase difference between the light reflected from the amorphous region and the light reflected from the crystalline region.

It should noted that write and read can be performed by utilizing phase change between a Metastable crystalline phase such as martensite and a stable crystalline phase or phase change between metastable crystalline phases as well as the phase change between the crystalline phase and the amorphous phase noted above.

(Approaches for Improving the Recording Density)

For improving the amount of information that can be recorded in a single recording media, i.e., the recording capacity, it is conceivable to employ the two approaches given below.

A first approach is to reduce the pitch of the recording marks in the track direction, i.e., the so-called bit pitch. However, when the bit pitch is significantly reduced, it will become smaller than the size of a read beam. In such a case, two recording marks may be included temporarily in a read beam spot. Where the recording marks are sufficiently separated from each other, the read signals are greatly modulated so as to make it possible to obtain signals with high amplitude. However, where the recording marks are close to each other, the obtained signals have lowered amplitude, with the result that errors tend to occur in the stage of converting the signals into digital data.

The other approach is to reduce the track pitch. This approach makes it possible to improve the recording density without being affected significantly by lowering in the signal intensity that is caused by the bit pitch reduction noted above. In this approach, however, a so-called cross-erase problem is caused. Specifically, if the track pitch is made substantially equal to or smaller than a light beam size, the information in a certain track deteriorates when writing or erasure is performed on the adjacent track.

The cross-erase is caused partly because the mark on the track in question is irradiated directly with the edge of the laser beam on the adjacent track, and partly because heat generated in recording flows from the adjacent track so as to raise the temperature of the mark on the track in question and, thus, to deform the mark. In order to improve the recording density of the phase-change optical recording media, it is necessary to overcome the problems pointed out above. Also, in order to suppress the probability of read errors for small recording marks to a low level, it is desirable that the recording marks be formed to have an even contour so as to suppress noise components as much as possible.

It is expected that a light beam with a shorter wavelength greatly contributes to the approaches of reducing the bit pitch and the track pitch. At present, a blue-violet semiconductor laser (LD) with the shortest wavelength in the visible region has been put to a practical use. It should be noted that a light source in an ultraviolet region is used in the manufacture of a master of the optical disc, i.e., in the so-called mastering process, but a commercially available ultraviolet semiconductor laser has not yet been realized. However, polycarbonate generally used for the substrate significantly absorbs ultraviolet light with a shorter wavelength than the visible light. The polymer material generally tends to absorb light in the ultraviolet region. Thus, it is necessary to use a substrate other than the conventional one in order to satisfy the requirement for use in the ultraviolet region. However, a substrate material suitable to the ultraviolet region has not yet been found. This is also the case with not only the substrate but also the materials for optical parts used in an optical recording-reproducing apparatus. Therefore, it is considered advantageous to employ a multilayered optical recording media described in the following for further improvement in the recording capacity.

(Improvement in Recording Capacity by Use of a Multi-layered Optical Recording Media)

Another approach for improving the recording capacity is to stack information layers each including a phase-change optical recording film. See, for example, Japanese Patent Disclosure (Kokai) No. 2000-322770. The recording media designed such that two information layers are stacked and the information is written to and read from one side is called a single-sided, dual-layer disc or is simply called a dual-layer disc. In the single-sided, dual-layer disc, it is necessary for the information layer close to the light incident side, which is hereinafter called L0, to have at least 50% of transmittance. This is because it is important to prevent the light from being attenuated excessively in the information layer L0 close to the light incident side in accessing to the information layer remote from the light incident side, which is hereinafter referred to as L1. In order to achieve the requirement, it is necessary for the phase-change optical recording film included in the L0 information layer to be very thin, i.e., not thicker than 10 nm. In the case of such a thin recording film, the retention time required for crystallization is prolonged, with the result that the recording marks fail to be erased completely at a normal recording speed, bringing about lowering of erasure rate. As a measure for overcoming the difficulty, it is known that substitution of a part of the GeSbTe recording film with Sn or with Bi, In, Sn and Pb is effective. On the other hand, it is necessary for the L1 layer to perform recording and erasure with the laser beam with intensity substantially halved by the L0 layer, the L1 layer is required to exhibit high sensitivity.

A technique relating to a triple-layer media or a quadruple-layer media having increased information layers is also known. See, for example, Iida et al., The Technical Report of the Proceeding of the Institute of Electronics, Information and Communication engineers, CPM 2000-96 (2000-09). Also in the multilayered optical recording media, the information layers are defined as L0, L1, L2, and L3 as viewed from the light incident side. The document discloses a method of manufacturing a triple-layer or quadruple-layer ROM media comprising steps of: depositing the L0 layer on a substrate, forming an interlayer separating layer made of a resin by a so-called 2P (Photo-Polymerization) process, transferring grooves or pits onto the interlayer separating layer with a plastic stamper, stripping the plastic stamper, and depositing the L1 layer on the interlayer separating layer. However, since the method requires the process of stripping the plastic stamper from the interlayer separating layer, it is difficult to manufacture even the dual-layer media. Naturally, it is very difficult to commercially manufacture a multilayered media at low cost with high stability.

Another single-sided, dual-layer media having a thin cover layer mounted on the light incident side of the information layer is also proposed on the prerequisite that a blue-violet light source and an optical pickup including an objective lens having a high numerical aperture NA (a high NA type objective lens) are employed. In the single-sided, dual-layer media of this type, the thickness of the cover layer on the light incident side is set to about 75 µm and the thickness of the interlayer separating layer is set to about 25 µm. However, since the characteristics of the particular single-sided, dual-layer media are markedly affected by thickness distribution of the interlayer separating layer and the cover layer, it is difficult to control the characteristics. The method of manufacturing the particular single-sided, dual-layer media also includes steps of: forming an interlayer separating layer by the so-called 2P process, transferring grooves or pits on the interlayer separating layer with a plastic stamper, and stripping the plastic stamper. Thus, it is difficult to commercially manufacture with high stability and at low cost the next-generation single-sided, dual layer media with a recording density higher than that of DVD available at present by using a thin cover layer and by the manufacturing method including the step of stripping the plastic stamper. Further, even if commercial manufacture of a triple-layer or quadruple-layer media is attempted by application of the technique described above, it is estimated substantially impossible to achieve stable and low-cost manufacture.

On the other hand, there is proposed a method of manufacturing a next-generation rewritable media comprising steps of: depositing an information layer on each of two rigid substrates having a thickness of about 0.6 mm, and bonding the two substrates, like the method of manufacturing the current dual-layer media, i.e., a so-called DVD-9. Since the particular method does not include the process of stripping the plastic stamper and does not necessitate the use of a thin cover layer, it is possible to commercially manufacture the single-sided, dual layer media with high stability and at low cost. Therefore, it is desirable for the particular manufacturing method to be applicable to the manufacture of the triple-layer or quadruple-layer media.

(Interlayer Cross-talk)

In order to sufficiently focus the laser beam on each information layer and to suppress loss of the laser beam to a minimum level in the triple-layer or quadruple-layer media, it is necessary to make the interlayer separating layer thinner than that in the dual-layer media. In this case, during read operation from a certain information layer, the read signals may be significantly affected by the so-called interlayer cross-talk (XT), which is caused by leakage signals or noises from another information layer from which data is not being read, i.e., the information layer not in reproducing. Therefore, it is necessary to develop a technique for avoiding the interlayer cross-talk.

(Methods for High-speed Recording)

High-speed recording is also required for the phase-change optical recording media. For example, if the recording can be performed in a time shorter than the actual viewing time, it is possible to easily realize the so-called "time-shift function" that the previous images can be viewed in the copying stage of the distributed recording media or during the real-time recording of the broadcasting images. However, one of the factors for inhibiting the high-speed recording in phase-change recording is a problem that the data fails to be erased completely when crystallization is performed in the overwrite stage with a laser beam at a relatively low erasure level, i.e., the problem of the insufficient erasure rate. Since a recording mark passes through the laser spot at a high speed, it is difficult to retain the recording mark for a sufficiently long time in temperature range within which the crystallization can be occurred, with the result that the data fails to be erased completely. Therefore, uniformity of the shape of the recording marks and the recording film itself becomes more important in view of the erasure operation, too. For improving the uniformity of the mark shape, the uniformity of the initialized state, i.e., the crystalline state, becomes very important.

(Film Design for Phase-change Optical Recording Media)

In the phase-change optical recording media, an amorphous mark or data is written in a desired portion of the recording film by irradiating that portion with a pulsed laser beam. In contrast, the recording film is irradiated with a laser beam so as to crystallize the amorphous mark, thereby erasing the data. In the former stage, an amorphous mark is formed by rapidly cooling the laser beam-irradiated portion, and in the latter stage, the amorphous portion is crystallized by gradually cooling the laser beam-irradiated portion. Also, the recording and erasure can be performed with a lower laser power when the absorbance in the recording film is high. In contrast, a higher laser power is required for recording and erasure when the absorbance in the recording film is low. The absorbance in the recording film is determined by the optical characteristics of the recording media formed of a multi-layered film. What is also important is the thermal design relating to the film structure as to, for example, whether a rapid cooling structure is established, even if the absorbance is the same. Thus, in the film design for the phase-change optical recording media, the optical design and the thermal design are mainly taken into consideration. For the optical design, the optical characteristics of each thin film are needed. Also, for the thermal design, the thermal properties, including the melting point, the latent heat of melting, and the crystallization temperature, are needed for each thin film.

As described above, in the case of the single-sided, dual-layer media, it is necessary for the L0 layer on the light incident side to exhibit a transmittance not lower than 50%. As a result, it is necessary for the L0 layer to be made markedly thin, i.e., the thickness of the L0 layer is required to be 5 to 7 nm. Also, the thickness of the L1 layer is not significantly great, i.e., the thickness of the L1 layer is required to be 10 nm or less. The multilayered optical recording media including at least three information layers, which is available at present, is a ROM or a write-once media (R media). When it comes to the rewritable media, a multilayered optical recording media has not yet exhibited practical characteristics. In the case of a single-sided, triple-layer optical recording media, it is necessary for each of the L0 and L1 information layer on the light incident side to exhibit a transmittance of at least 70%. In the case of a single-sided, quadruple-layer media, it is necessary for each of the L0, L1 and L2 information layer on the light incident side to exhibit a transmittance of at least 80%. Under the circumstances, in the multilayered media including at least three information layers, the phase-change recording film included in each of the information layers on the light incident side is considered to play a more important role, compared with that included in the single-sided, dual-layer media. In addition, it is necessary to consider the problem of interlayer cross-talk in the multilayered media, which is not considered in the single-layer media. Therefore, the optical design and the thermal design of the media including the selection of the materials for the recording film and the interface film become more important.

BRIEF SUMMARY OF THE INVENTION

An optical recording media according to an aspect of the present invention comprises: two or more information layers, at least one of the information layers including a writable recording film, at least one information layer having protrusions and recesses that permit tracking and at least another one information layer being substantially flat.

An optical recording-reproducing apparatus recording to and reproducing from the above optical recording media comprises: a light source; a polarization beam splitter, through which a light beam emitted from the light source is applied to the recording films included in the two or more information layers, splitting light beams reflected from the recording films included in the information layers based on difference in a polarized wave component of the reflected light beams; and a photodetector detecting the light beam split by the polarization beam splitter.

DETAILED DESCRIPTION OF THE INVENTION

An optical recording media according to an embodiment of the present invention comprises a plurality of information layers stacked in the light incident direction. Specifically, the optical recording media includes, for example, a single-sided, dual-layer media, a single-sided, triple-layer media, and a single-sided quadruple-layer media. At least one of the information layers including a rewritable recording film which brings about reversible change by irradiation with light (e.g., a phase-change recording film) or a write-once recording film which brings about irreversible change by irradiation with light. It is possible that all of the information layers include a phase-change optical recording film. It is also possible that the information layers include a combination of a phase-change optical recording film and a ROM or a write-once recording film.

In an embodiment of the present invention, the phase-change recording film is formed of a material represented by, for example, the general formula: $Ge_xSb_yTe_z$, where $x+y+z=100$, wherein the recording film has a composition within a range defined by $x=55$, $z=45$; $x=45$, $z=55$; $x=10$, $y=28$, $z=42$; and $x=10$, $y=36$, $z=54$ on the ternary phase diagram of GeSbTe. Also, the phase-change recording film may be formed of a material in which a part of the constituent elements of the above material is substituted with Bi and/or Sn, and having a composition represented by the general formula: $(Ge_{(1-w)}Sn_{(w)})_x(Sb_{(1-v)}Bi_{(v)})_yTe_z$, where $x+y+z=100$, $0 \leq w < 0.5$ and $0 \leq v < 1.0$.

In the optical recording media according to an embodiment of the present invention, at least one information layer has protrusions and recesses that permit tracking and at least another one information layer is substantially flat.

Figure 1:
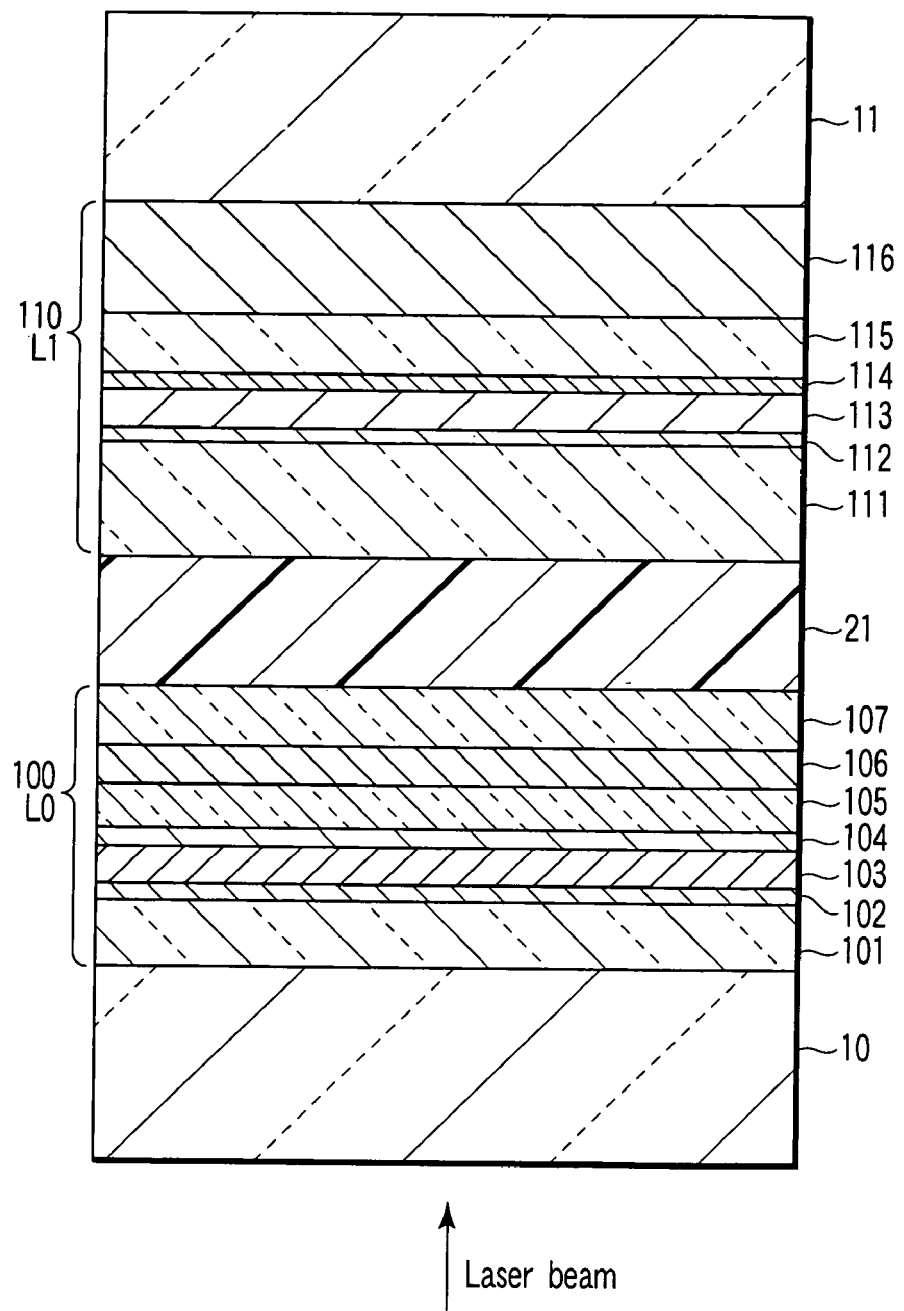
FIG. 1 is a cross-sectional view showing an optical recording media according to an embodiment of the present invention.

FIG. 1 shows a single-sided, dual-layer optical recording media having the simplest film construction among the optical recording media according to the embodiments of the present invention. In FIG. 1, an L0 information layer 100 positioned close to the light incident side is prepared by depositing, on a substrate 10 having a land-groove structure formed thereon, a dielectric film (a first dielectric film) 101, an interface film (a first interface film) 102, a recording film 103, another interface film (a second interface film) 104, another dielectric film (a second dielectric film) 105, a translucent reflective film 106, and a still another dielectric film 107. An L1 information layer 110 positioned away from the light incident side is prepared by depositing, on a mirror substrate 11 which is substantially flat without grooves, a thick reflection film 116, a dielectric film 115, an interface film 114, a phase-change recording film 113, another interface film 112, and another dielectric film 111. The L0 information layer 100 and L1 information layer 110 are bonded to each other with an interlayer separating layer 21 made of, for example, a UV-curing resin.

The film construction of the optical recording media according to an embodiment of the present invention is not limited to that shown in FIG. 1. For example, it is possible to omit the dielectric film included in the stack of the interface film and the dielectric film formed on both surfaces of the phase-change recording film and only the interface film may be provided. It is also possible to form two or more dielectric films between the reflective film and the interlayer separating layer. Further, it is possible to omit the reflective film. By contraries, it is possible that the reflective film may be formed of a plurality of layers.

The recording-reproducing principle of the optical recording media shown in FIG. 1 according to an embodiment of the present invention will be described briefly. Specifically, for recording to and reproducing from the L0 layer 100 having protrusions and recesses that permits tracking, tracking and focusing are performed in the L0 layer 100 as in the conventional manner. On the other hand, tracking cannot be achieved by the conventional method to the L1 layer 110 that is substantially flat without grooves. In the embodiment of the present invention, for recording to and reproducing from the L1 layer 110, the light beam is focused on the L1 layer 110 for recording and reproducing while performing tracking in the L1 layer 110 by utilizing the grooves of the L0 layer 100. In this case, it is possible to perform tracking as well as recording and reproducing by use of light emitted from the light source and transmitted on the same axis.

When recording and reproducing are performed for the L1 layer 110, reflected beams are brought back from both the L1 layer 110 and the L0 layer 100 because the L0 layer 100 is translucent. Therefore, the optical recording-reproducing apparatus according to an embodiment of the present invention includes an optical circuit adapted to individually separate the light beams reflected from the information layers, to extract the light beam reflected from a particular information layer from the light beams reflected from the plural information layers, or to amplify the light beam reflected from a particular information layer selected from the light beams reflected from the plural information layers.

Figure 2:
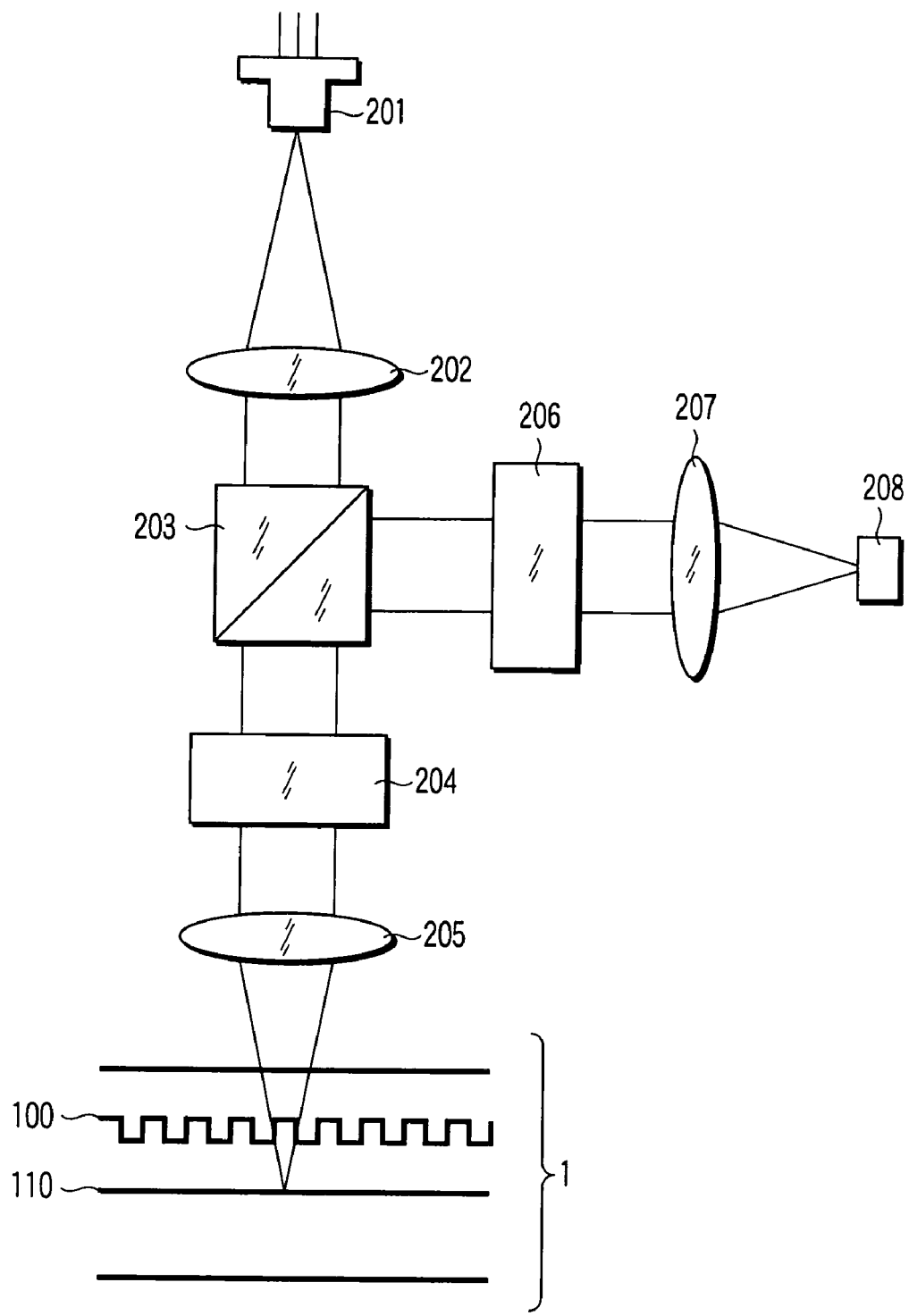
FIG. 2 a schematic view showing an optical recording-reproducing apparatus according to an embodiment of the present invention.

An example of an optical recording-reproducing apparatus according to an embodiment of the present invention will be described with reference to FIG. 2. In the drawing, the L0 layer 100 included in the optical recording media 1 is depicted as a layer having protrusions and recesses and the L1 layer 110 is depicted as a flat layer for simplifying the drawing. In the optical recording-reproducing apparatus according to an embodiment of the present invention, a light beam emitted from a light source 201 passes through a lens 202, a polarization beam splitter 203, and an element 204 for varying the plane of polarization such as a wavelength plate or a polarizing plate. As a result, the plane of polarization of the light beam that has passed through the element 204 is varied or rotated. The light beam further passes through a lens 205 to be applied to the optical recording media 1. In this case, focusing is exerted on the L1 layer 110 while performing tracking on the L0 layer 100. The light beams returning from the L1 layer 110 and the L0 layer 100 are allowed to pass through the lens 205 and the element 204 for varying the plane of polarization such as the wavelength plate or the polarizing plate. As a result, the plane of polarization of the polarized light beam is varied or rotated. The polarized light beam is reflected by the polarization beam splitter 203 and, then, passes through a polarizing filter 206 with the result that a desired polarized light component is extracted. Further, the extracted polarized light beam passes through a lens 207 and, then, detected by a photodetector 208. In this fashion, the light beams reflected from the L1 layer 110 and from the L0 layer 100 can be split from each other by utilizing the difference in the polarized wave component between these two reflected light beams. The photodetector (optical pickup) 208 can be formed of, for example, a four-divided photodiode that is employed in a current optical disc apparatus. If a hologram element is used as the photodetector 208, the signal-to-noise ratio can be markedly improved.

Also, in the case of using different reproducing schemes based on, for example, reflectance difference and phase difference for two adjacent information layers, it is possible to reduce the thickness of the interlayer separating layer.

EXAMPLES

The examples described in the following are directed to a single-sided, dual-layer media, a single-sided triple-layer media or a single-sided, quadruple-layer media. The information layers included in each optical recording media are referred to as Li layers (where i=0, 1, 2, or 3). In the case of performing the land/groove (L/G) recording, a read/write characteristic value for each information layer is represented by a lower value determined for either the land or the groove.

Example 1

In the present Example, a single-sided, dual-layer media is prepared by using a grooved substrate for the L0 layer and a mirror substrate for the L1 layer, and both the information layers are reproduced based on reflectance difference.

FIG. 1 is a cross-sectional view showing the optical recording media in the present Example. The substrate 10 for the L0 layer 100 and the substrate 11 for the L1 layer 110 are polycarbonate (PC) substrates prepared by injection molding and having a thickness of about 0.58 mm. Grooves are formed at a pitch of 0.76 μm on the substrate 10 for the L0 layer 100 positioned close to the light incident side. In performing land/groove recording, the track pitch corresponds to 0.38 μm. A so-called mirror substrate that is flat and not having grooves is used as the substrate 11 of the L1 layer 110 positioned remote from the light incident side.

The L0 layer 100 is prepared by depositing, on that surface of the substrate 10 on which grooves are formed, a dielectric film 101 made of $ZnS:SiO_2$, an interface film 102 made of $HfO_x$ (x=1 to 2), a phase-change recording film 103 made of GeSbTeBi, another interface film 104 made of $HfO_x$, another dielectric film 105 made of $ZnS:SiO_2$, a translucent reflective film 106 made of an Ag alloy, and still another dielectric film 107 made of $ZnS:SiO_2$ with a sputtering apparatus.

The L1 layer 110 is prepared by depositing, on the mirror surface of the substrate 11, a thick reflection film 116 made of an Ag alloy, a dielectric film 115 made of $ZnS:SiO_2$, an interface film 114 made of $HfO_x$, a phase-change recording film 113 made of GeSbTeBi, another interface film 114 made of $HfO_x$, and another dielectric film 111 made of $ZnS:SiO_2$ with a sputtering apparatus.

The employed sputtering apparatus is a so-called batch type sputtering apparatus in which various films are sputtered in different chambers. The sputtering apparatus is provided with a vacuum transfer chamber so that the substrate is transferred in vacuum throughout the sputtering process until the deposition of the last film is completed. Projections called stack ribs are formed on that surface of the mirror substrate 11 on which the films are not deposited so as to make the particular surface distinctive from the surface for deposition. The $ZnS:SiO_2$ film is formed by sputtering using a mixed target made of 80 mol % of ZnS and 20 mol % of $SiO_2$.

The film construction is designed such that the L0 layer 100 exhibits 52% of an average transmittance for a light beam with a wavelength of 405 nm and each phase-change recording film of the L0 layer 100 and the L1 layer 110 exhibits a reflectance of 5% on the crystallized portions. The optical recording media in the present Example is designed to be reproduced based on reflectance difference in both the L0 layer 100 and the L1 layer 110.

Next, the recording film included in each information layer is crystallized over the entire surface of the media with an initializing apparatus. After the initialization, the substrates 10 and 11 are bonded by a UV-curing resin with facing the deposited surfaces to each other, so as to form an interlayer separating layer 21. The thickness of the interlayer separating layer 21 is about 20 μm.

A tester employed comprises an optical pickup provided with a blue-violet semiconductor laser with a wavelength of 405 nm and an objective lens whose numerical aperture (NA) is 0.65. The tester performs recording and reproducing for the information layer having the grooves under ordinary focusing and tracking conditions. The tester performs recording and reproducing for the substantially flat information layer with focusing to the target information layer while performing tracking on the other information layer having the grooves not in reproducing. The tester is also provided with an optical circuit as shown in FIG. 2 so as to make it possible to split the light beams reflected from the two recording films based on difference in the polarized wave component. As described above, in the case where recording and reproducing are performed for the substantially flat information layer, tracking is performed with utilizing another information layer having grooves not in reproducing. Therefore, on the assumption that there are imaginary tracks even in the substantially flat information layer, the expression that the recording and reproducing are performed on the tracks is used herein with respect to the substantially flat information layer for the sake of convenience.

The characteristics of the optical recording media are evaluated in respect of the items given below. These evaluations are commonly performed for the other Examples and the Comparative Examples described herein later.

(1) Measurement of Bit Error Rate (SbER: Simulated Bit Error Rate):

The SbER measurement is for evaluating the error rate of the data. In the first step, marks containing patterns of 2T to 13T at random are overwritten 10 times in a prescribed initial track at 1× recording speed. Next, the same random patterns are overwritten 10 times in the adjacent tracks on both sides of the initial track. Then, the SbER value is measured on the initial track.

(2) Analog Measurement:

The analog measurement is for evaluating the quality of the read signal. In the first step, marks containing patterns of 2T to 13T at random are overwritten 10 times. Next, single patterns of 9T marks are overwritten once on the above marks, followed by measuring the carrier-to-noise ratio (CNR) of the signal frequency of the 9T marks by a spectrum analyzer. Then, the recording marks are irradiated with a laser beam of an erasure power level by one rotation of the disc so as to erase the recording marks. The amount of reduction in the signal intensity of the 9T marks after the laser beam irradiation is measured. The measured value is defined as an erasure rate (ER). Then, the head is moved to a track sufficiently apart from the original position so as to measure the cross-erase (E-X).

(3) Overwriting (OW) Test:

After random signals are overwritten 2,000 times in the same track, the bit error rate (SbER) is measured as described above.

The results of evaluations for the optical recording media in the present Example are as follows. The initial characteristics are CNR of 53.2 dB, X-E of 0.2 dB, and SbER of not higher than $2.0 \times 10^{-5}$, exhibiting a practical error rate. The overwriting characteristics are CNR of 52.7 dB, and SbER of not higher than $2.9 \times 10^{-5}$, exhibiting very satisfactory values.

Table 1 shows the results of evaluations of the optical recording media for each of the Examples. As described above, the poorest value among the data for various tracks is given in Table 1 as the representative value.

Example 2

In the present Example, a single-sided, dual-layer media is prepared by using a mirror substrate for the L0 layer and a grooved substrate for the L1 layer. The L0 layer is reproduced based on reflectance difference and the L1 layer is reproduced based on phase difference.

Figure 3:
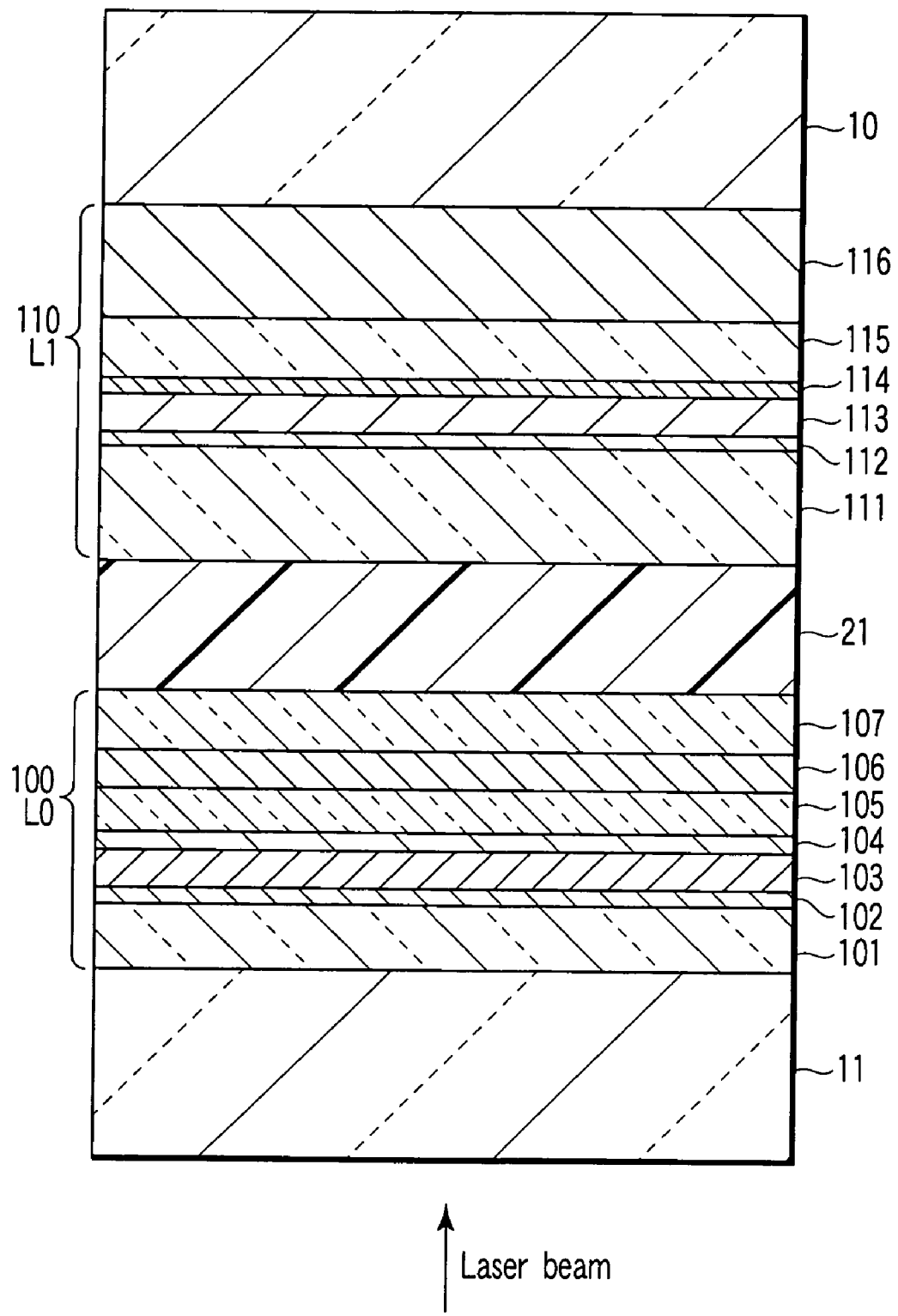
FIG. 3 is a cross-sectional view showing an optical recording media in Example 2 of the present invention.

FIG. 3 is a cross-sectional view showing the optical recording media in the present Example. The substrate 11 for the L0 layer 100 and the substrate 10 for the L1 layer 110 are polycarbonate (PC) substrates prepared by injection molding and having a thickness of about 0.58 mm. A so-called mirror substrate that is flat and not having grooves is used as the substrate 11 of the L0 layer close to the light incident side. Grooves are formed at a pitch of 0.76 μm on the substrate 10 for the L1 layer positioned remote from the light incident side. In performing land/groove recording, the track pitch corresponds to 0.38 μm.

The L0 layer 100 is prepared by depositing, on that mirror surface of the substrate 11, a dielectric film 101 made of $ZnS:SiO_2$, an interface film 102 made of HfSiOC, a phase-change recording film 103 made of GeSbTeBi, another interface film 104 made of HfSiOC, another dielectric film 105 made of $ZnS:SiO_2$, a translucent reflective film 106 made of an Ag alloy, and still another dielectric film 107 made of $ZnS:SiO_2$ with a sputtering apparatus.

The L1 layer 110 is prepared by depositing, on that surface of the substrate 10 on which grooves are formed, a thick reflection film 116 made of an Ag alloy, a dielectric film 115 made of $ZnS:SiO_2$, an interface film 114 made of HfSiOC, a phase-change recording film 113 made of GeSbTeBi, another interface film 112 made of HfSiOC, and another dielectric film 111 made of $ZnS:SiO_2$ with a sputtering apparatus.

The film construction is designed such that the L0 layer 100 exhibits 52% of an average transmittance for a light beam with a wavelength of 405 nm and each phase-change recording film of the L0 layer 100 and the L1 layer 110 exhibits a reflectance of 5% on the crystallized portions. The optical recording media in the present Example is designed to be reproduced based on reflectance difference in the L0 layer 100 and based on phase difference in the L1 layer 110.

The recording film included in each information layer is crystallized over the entire surface of the media with an initializing apparatus. After the initialization, the substrates 10 and 11 are bonded by a UV-curing resin with facing the deposited surfaces to each other, so as to form an interlayer separating layer 21. The thickness of the interlayer separating layer 21 is about 15 μm. The optical recording media is evaluated as in Example 1 with the tester equal to that used in Example 1.

The results of evaluations of the optical recording media in the present Example are as follows, which are also shown in Table 1. The initial characteristics are CNR of 54.3 dB, X-E of 0.1 dB, and SbER of not higher than $2.2 \times 10^{-5}$, exhibiting a practical error rate. The overwriting characteristics are CNR of 53.8 dB, and SbER of not higher than $2.8 \times 10^{-5}$, exhibiting very satisfactory values.

Example 3

In the present Example, a single-sided, triple-layer media is prepared in which reproduction based on reflectance difference and reproduction based on phase difference are employed in combination.

Figure 4:
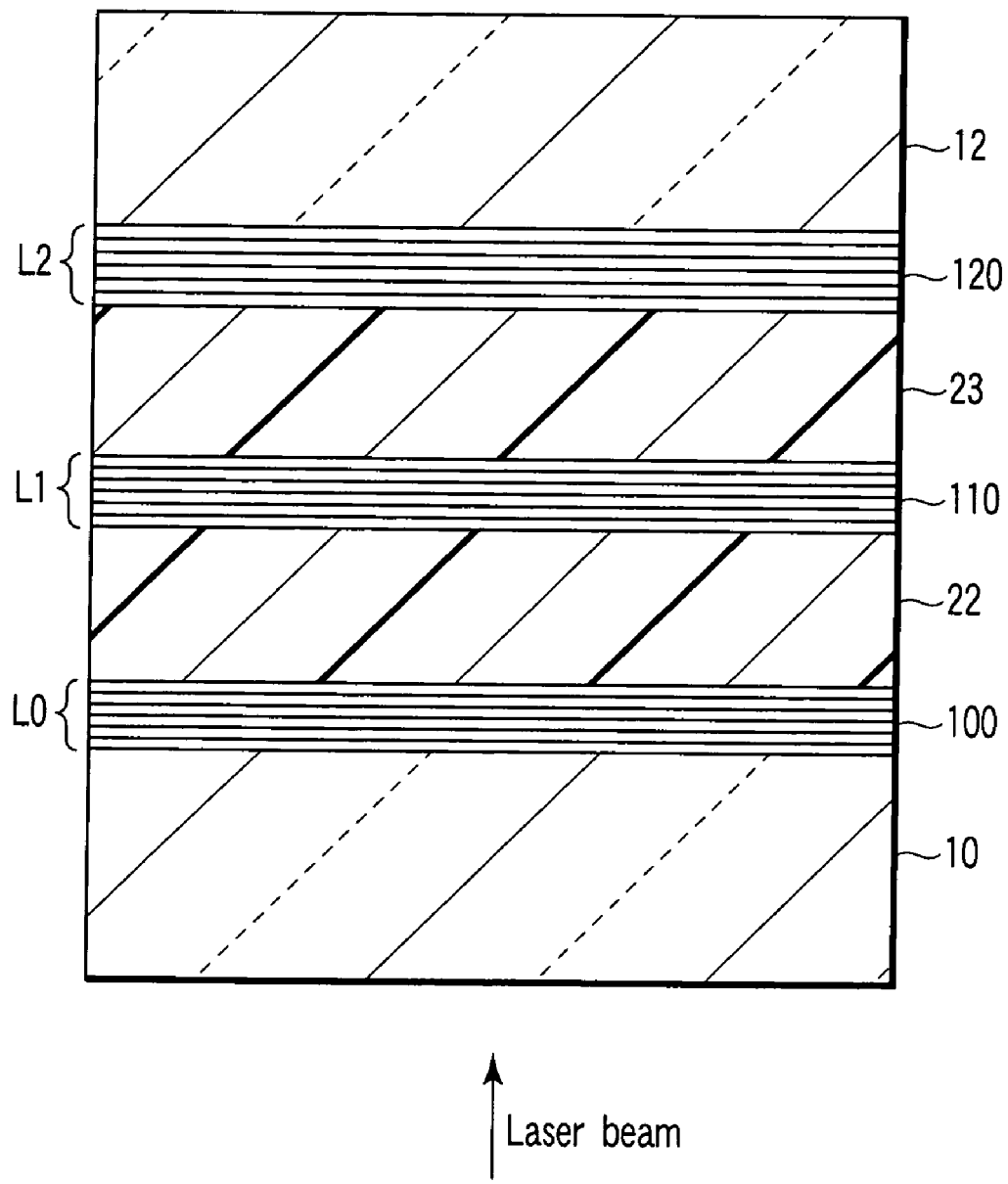
FIG. 4 is a cross-sectional view showing an optical recording media in Example 3 of the present invention.

FIG. 4 is a cross-sectional view showing the optical recording media in the present Example. The substrate 10 for the L0 layer is a polycarbonate (PC) substrate prepared by injection molding and having a thickness of about 0.58 mm on which grooves are formed at a pitch of 0.76 μm. In performing land/groove recording, the track pitch corresponds to 0.38 μm. The L1 layer remoter than the L0 layer as viewed from the light incident side is formed as a flat information layer on a substantially flat interlayer separating layer 22 without grooves formed on the L0 layer by the 2P method. The substrate 12 for the L2 layer remoter than the L1 layer as viewed from the light incident side is a polycarbonate (PC) substrate prepared by injection molding and having a thickness of about 0.58 mm on which grooves are formed at a pitch of 0.76 μm.

The L0 layer 100 is prepared by depositing, on that surface of the substrate 10 on which grooves are formed, a dielectric film made of $ZnS:SiO_2$, an interface film made of HfSiOC, a phase-change recording film made of GeSbTeBi, another interface film made of HfSiOC, another dielectric film made of $ZnS:SiO_2$, a translucent reflective film made of an Ag alloy, and still another dielectric film made of $ZnS:SiO_2$ with a sputtering apparatus.

The interlayer separating layer 22 is formed in a thickness of about 15 μm on the L0 layer 100 by the 2P method. The L1 layer 110 is prepared by depositing, on the flat surface of the interlayer separating layer 22, a dielectric film made of $ZnS:SiO_2$, an interface film made of HfSiOC, a phase-change recording film made of GeSbTeBi, another interface film made of HfSiOC, another dielectric film made of $ZnS:SiO_2$, a translucent reflective film made of an Ag alloy, and still another dielectric film made of $ZnS:SiO_2$ with a sputtering apparatus. It should be noted that the L1 layer can also be prepared by bonding a flat PC sheet.

The L2 layer 120 remotest from the light incident side is prepared by depositing, on that surface of the substrate 12 on which grooves are formed, a thick reflection film made of an Ag alloy, a dielectric film made of $ZnS:SiO_2$, an interface film made of HfSiOC, a phase-change recording film made of GeSbTeBi, another interface film made of HfSiOC, and another dielectric film made of $ZnS:SiO_2$ with a sputtering apparatus.

The film construction is designed such that each of the L0 layer and the L1 layer exhibits 52% of an average transmittance for a light beam with a wavelength of 405 nm and each phase-change recording film of the L0 layer and the L1 layer exhibits a reflectance of 5% on the crystallized portions. The optical recording media in the present Example is designed to be reproduced based on reflectance difference in the L0 layer, based on phase difference in the L1 layer, and based on reflectance difference in the L2 layer.

The recording film included in each information layer is crystallized over the entire surface of the media with an initializing apparatus. After the initialization, the substrates 10 and 12 are bonded by a UV-curing resin with facing the deposited surfaces to each other, so as to form an interlayer separating layer 23. The thickness of the interlayer separating layer 23 is about 15 μm. The optical recording media is evaluated as in Example 1 with the tester equal to that used in Example 1.

The results of evaluations of the optical recording media in the present Example are as follows, which are also shown in Table 1. The initial characteristics are CNR of 52.9 dB, X-E of 0.2 dB, and SbER of not higher than $3.4 \times 10^{-5}$, exhibiting a practical error rate. The overwriting characteristics are CNR of 51.9 dB, and SbER of not higher than $3.2 \times 10^{-5}$, exhibiting very satisfactory values.

Example 4

In the present Example, a single-sided, quadruple-layer media is prepared in which reproduction based on reflectance difference and reproduction based on phase difference are employed in combination.

Figure 5:
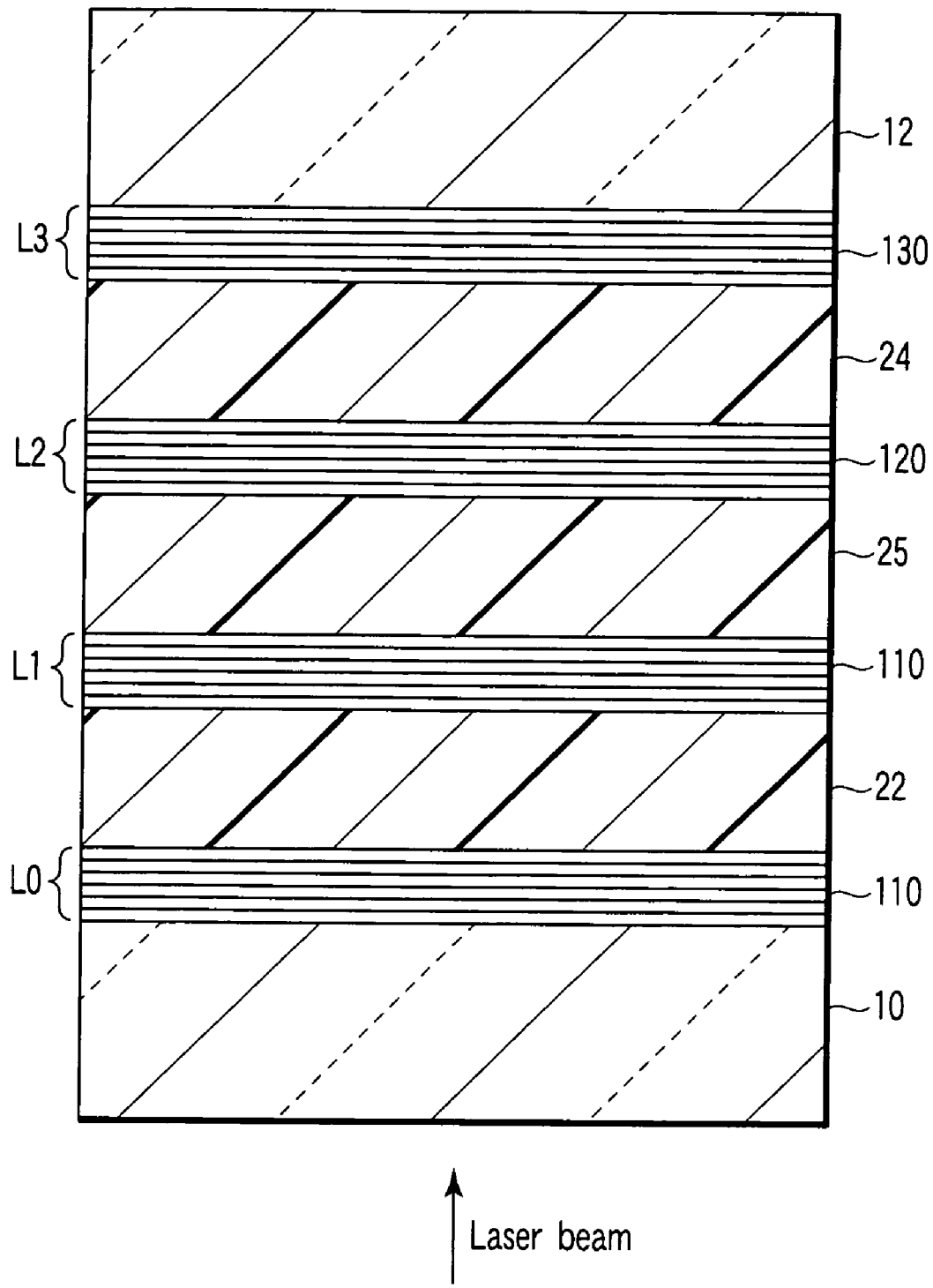
FIG. 5 is a cross-sectional view showing an optical recording media in Example 4 of the present invention.

FIG. 5 is a cross-sectional view showing the optical recording media in the present Example. The substrate 10 for the L0 layer is a polycarbonate (PC) substrate prepared by injection molding and having a thickness of about 0.58 mm on which grooves are formed at a pitch of 0.76 μm. In performing land/groove recording, the track pitch corresponds to 0.38 μm. The L1 layer remoter than the L0 layer as viewed from the light incident side is formed as a flat information layer on a substantially flat interlayer separating layer 22 without grooves formed on the L0 layer by the 2P method. The substrate 12 for the L3 layer remotest from the light incident side is a polycarbonate (PC) substrate prepared by injection molding and having a thickness of about 0.58 mm on which grooves are formed at a pitch of 0.76 μm, similar to the substrate 10 for the L0 layer. The L2 layer between the Li layer and the L3 layer is formed as a flat information layer on a substantially flat interlayer separating layer 24 without grooves formed on the L3 layer by the 2P method.

The L0 layer 100 is prepared by depositing, on that surface of the substrate 10 on which grooves are formed, a dielectric film made of $ZnS:SiO_2$, an interface film made of GeN, a phase-change recording film made of GeSbTeBi, another interface film made of GeN, a translucent reflective film made of an Ag alloy, and another dielectric film made of $TiO_2$ with a sputtering apparatus.

The interlayer separating layer 22 is formed in a thickness of about 10 μm on the L0 layer 100 by the 2P method. The L1 layer 110 is prepared by depositing, on the flat surface of the interlayer separating layer 22, a dielectric film made of $ZnS:SiO_2$, an interface film made of GeN, a phase-change recording film made of GeSbTeBi, another interface film made of GeN, a translucent reflective film made of an Ag alloy, and another dielectric film made of $TiO_2$ with a sputtering apparatus. It should be noted that the L1 layer can also be prepared by bonding a flat PC sheet.

The L3 layer 130 remotest from the light incident side is prepared by depositing, on that surface of the substrate 12 on which grooves are formed, a thick reflection film made of an Ag alloy, a dielectric film made of $ZnS:SiO_2$, an interface film made of GeN, a phase-change recording film made of GeSbTeBi, another interface film made of GeN, and another dielectric film made of $ZnS:SiO_2$ with a sputtering apparatus.

The interlayer separating layer 24 is formed in a thickness of about 10 μm on the L3 layer 130 by the 2P method. The L2 layer 120 is prepared by depositing, on the flat surface of the interlayer separating layer 24, a dielectric film made of $TiO_2$, a translucent reflective film made of an Ag alloy, an interface film made of GeN, a phase-change recording film made of GeSbTeBi, another interface film made of GeN and another dielectric film made of $ZnS:SiO_2$ with a sputtering apparatus.

The film construction is designed such that each of the L0 layer and the L1 layer exhibits 80% of an average transmittance for a light beam with a wavelength of 405 nm and each phase-change recording film of the L0 layer, the L1 layer and the L2 layer exhibits a reflectance of 5% on the crystallized portions. The optical recording media in the present Example is designed to be reproduced based on reflectance difference in the L0 layer, based on phase difference in the L1 layer, based on reflectance difference in the L2 layer, and based on phase difference in the L3 layer.

The recording film included in each information layer is crystallized over the entire surface of the media with an initializing apparatus. After the initialization, the substrates 10 and 12 are bonded by a UV-curing resin with facing the deposited surfaces to each other, so as to form an interlayer separating layer 25. The thickness of the interlayer separating layer 25 is about 10 μm. The optical recording media is evaluated as in Example 1 with the tester equal to that used in Example 1.

The results of evaluations of the optical recording media in the present Example are as follows, which are also shown in Table 1. The initial characteristics are CNR of 52.1 dB, X-E of 0.2 dB, and SbER of not higher than $3.9\times10^{-5}$, exhibiting a practical error rate. The overwriting characteristics are CNR of 51.7 dB, and SbER of not higher than $4.5\times10^{-5}$, exhibiting very satisfactory values.

Example 5

In the present Example, a single-sided, dual layer media including a L0 layer of a ROM media having data recorded in advance in the form of pits and an L1 layer of a flat information layer prepared by using a mirror substrate and including a phase-change recording film.

The L0 layer positioned close to the light incident side is prepared by forming a reflective film alone made of an Ag alloy with a sputtering apparatus on a ROM substrate prepared by writing data in advance in a polycarbonate (PC) substrate formed by injection molding and having a thickness of about 0.58 mm. The data is written in the PC substrate in advance in the form of pits at a track pitch of 0.4 μm.

The L1 layer is prepared by depositing, on the mirror surface of the mirror substrate, a thick reflection film made of an Ag alloy, a dielectric film made of $ZnS:SiO_2$, an interface film made of HfSiOC, a phase-change recording film made of GeSbTeBi, another interface film made of HfSiOC, and another dielectric film made of $ZnS:SiO_2$ with a sputtering apparatus.

The film construction is designed such that the L0 layer exhibits 52% of an average transmittance for a light beam with a wavelength of 405 nm, L0 layer exhibits a reflectance of 15% on the crystallized portions, and the phase-change recording film of the L1 layer exhibits a reflectance of 5% on the crystallized portions.

The phase-change recording film is crystallized with an initializing apparatus. After the initialization, two substrates are bonded by a UV-curing resin with facing the deposited surfaces to each other, so as to form an interlayer separating layer. The thickness of the interlayer separating layer is about 15 μm. The optical recording media is evaluated as in Example 1 with the tester equal to that used in Example 1.

The results of evaluations of the optical recording media in the present Example are as follows, which are also shown in Table 1. The initial characteristics are CNR of 53.5 dB, X-E of 0.1 dB, and SbER of not higher than $2.0\times10^{-5}$, exhibiting a practical error rate. The overwriting characteristics are CNR of 53.1 dB, and SbER of not higher than $2.8\times10^{-5}$, exhibiting very satisfactory values.

Example 6

In the present Example, a single-sided, dual-layer media including the L0 layer of a write-once media and the L1 layer of a flat information layer prepared by using a mirror substrate and including a phase-change recording film.

The L0 layer positioned close to the light incident side is obtained by forming grooves at a track pitch of 0.4 μm on a polycarbonate (PC) substrate prepared by injection molding and having a thickness of about 0.58 mm, spin-coating the PC substrate with an organic dye, and depositing a reflective film alone made of an Ag alloy on the PC substrate with a sputtering apparatus.

The L1 layer is prepared by depositing, on the mirror surface of the mirror substrate, a thick reflection film made of an Ag alloy, a dielectric film made of $ZnS:SiO_2$, an interface film made of HfSiOC, a phase-change recording film made of GeSbTeBi, another interface film made of HfSiOC, and another dielectric film made of $ZnS:SiO_2$ with a sputtering apparatus.

The film construction is designed such that the L0 layer exhibits 52% of an average transmittance for a light beam with a wavelength of 405 nm, and the phase-change recording film of the L1 layer exhibits a reflectance of 5% on the crystallized portions.

The phase-change recording film is crystallized with an initializing apparatus. After the initialization, two substrates are bonded by a UV-curing resin with facing the deposited surfaces to each other, so as to form an interlayer separating layer. The thickness of the interlayer separating layer is about 15 μm. The optical recording media is evaluated as in Example 1 with the tester equal to that used in Example 1.

The results of evaluations of the optical recording media in the present Example are as follows, which are also shown in Table 1. The initial characteristics are CNR of 53.4 dB, X-E of 0.2 dB, and SbER of not higher than $2.3\times10^{-5}$, exhibiting a practical error rate. The overwriting characteristics are CNR of 52.9 dB, and SbER of not higher than $2.8\times10^{-5}$, exhibiting very satisfactory values.

Example 7

The substrate for the L1 layer is a polycarbonate (PC) substrate prepared by injection molding and having a thickness of about 1.1 mm on which grooves are formed at a pitch of 0.68 μm. In performing land/groove recording, the track pitch corresponds to 0.38 μm. The L1 layer is prepared by depositing, on that surface of the PC substrate on which grooves are formed, a thick reflection film made of an Ag alloy, a dielectric film made of $ZnS:SiO_2$, an interface film made of HfSiOC, a phase-change recording film made of GeSbTeBi, another interface film made of HfSiOC, and another dielectric film made of $ZnS:SiO_2$ with a sputtering apparatus.

An interlayer separating layer made of a photopolymer sheet having a thickness of about 15 μm is formed on the L1 layer. The L0 layer is prepared by depositing, on the interlayer separating layer that is substantially flat, a dielectric film made of $ZnS:SiO_2$, a translucent reflective film made of an Ag alloy, another dielectric film made of $ZnS:SiO_2$, an interface film made of HfSiOC, a phase-change recording film made of GeSbTeBi, another interface film made of HfSiOC, and still another dielectric film made of $ZnS:SiO_2$ with a sputtering apparatus. A flat cover sheet with a thickness of about 0.1 mm is bonded to the light incident side of the L0 layer.

The film construction is designed such that the L0 layer exhibits 52% of an average transmittance for a light beam with a wavelength of 405 nm and each phase-change recording film of the L0 layer and the L1 layer exhibits a reflectance of 5% on the crystallized portions. The recording film included in each information layer is crystallized over the entire surface of the media with an initializing apparatus.

A tester employed comprises an optical pickup provided with a blue-violet semiconductor laser with a wavelength of 405 nm and an objective lens whose numerical aperture (NA)

is 0.85. The tester performs recording and reproducing for the information layer having the grooves under ordinary focusing and tracking conditions. The tester performs recording and reproducing for the substantially flat information layer with focusing to the target information layer while performing tracking on the other information layer having the grooves not in reproducing. The tester is also provided with an optical circuit as shown in FIG. 2 so as to make it possible to split the light beams reflected from the two recording films based on difference in the polarized wave component. The optical recording media is evaluated as in Example 1 with the above tester.

The results of evaluations of the optical recording media in the present Example are as follows, which are also shown in Table 1. The initial characteristics are CNR of 52.9 dB, X-E of 0 dB, and SbER of not higher than $3.2 \times 10^{-5}$, exhibiting a practical error rate. The overwriting characteristics are CNR of 51.5 dB, and SbER of not higher than $3.7 \times 10^{-5}$, exhibiting very satisfactory values.

Example 8

In the present Example, a single-sided, dual-layer media is prepared by using a mirror substrate for the L0 layer and a grooved substrate for the L1 layer. The L0 layer is reproduced based on reflectance difference and the L1 layer is reproduced based on phase difference.

FIG. 3 is a cross-sectional view showing the optical recording media in the present Example. The substrate 11 for the L0 layer 100 and the substrate 10 for the L1 layer 110 are polycarbonate (PC) substrates prepared by injection molding and having a thickness of about 0.58 mm. A so-called mirror substrate that is flat and not having grooves is used as the substrate 11 of the L0 layer close to the light incident side. Grooves are formed at a pitch of 0.76 μm on the substrate 10 for the L1 layer positioned remote from the light incident side. In performing land/groove recording, the track pitch corresponds to 0.38 μm.

The L0 layer 100 is prepared by depositing, on that mirror surface of the substrate 11, a dielectric film 101 made of ZnS:SiO$_2$, an interface film 102 made of $(ZrO_{2-x}N_x)_{1-y}(Y_2O_3)_y$, (where $0<x\leqq0.5$, $0<y\leqq0.1$), a phase-change recording film 103 made of GeBiTe, another interface film 104 made of $(ZrO_{2-x}N_x)_{1-y}(Y_2O_3)_y$, another dielectric film 105 made of ZnS:SiO$_2$, a translucent reflective film 106 made of an Ag alloy, and still another dielectric film 107 made of ZnS:SiO$_2$ with a sputtering apparatus.

The L1 layer 110 is prepared by depositing, on that surface of the substrate 10 on which grooves are formed, a thick film 116 made of an Ag alloy, a dielectric film 115 made of ZnS:SiO$_2$, an interface film 114 made of $(ZrO_{2-x}N_x)_{1-y}(Y_2O_3)_y$, a phase-change recording film 113 made of GeBiTe, another interface film 112 made of $(ZrO_{2-x}N_x)_{1-y}(Y_2O_3)_y$, and another dielectric film 111 made of ZnS:SiO$_2$ with a sputtering apparatus.

The film construction is designed such that the L0 layer 100 exhibits 52% of an average transmittance for a light beam with a wavelength of 405 nm and each phase-change recording film of the L0 layer 100 and the L1 layer 110 exhibits a reflectance of 5% on the crystallized portions. The optical recording media in the present Example is designed to be reproduced based on reflectance difference in the L0 layer 100 and based on phase difference in the L1 layer 110.

The recording film included in each information layer is crystallized over the entire surface of the media with an initializing apparatus. After the initialization, the substrates 10 and 11 are bonded by a UV-curing resin with facing the deposited surfaces to each other, so as to form an interlayer separating layer 21. The thickness of the interlayer separating layer 21 is about 15 μm. The optical recording media is evaluated as in Example 1 with the tester equal to that used in Example 1.

The results of evaluations of the optical recording media in the present Example are as follows, which are also shown in Table 1. The initial characteristics are CNR of 53.6 dB, X-E of 0.1 dB, and SbER of not higher than $2.0 \times 10^{-5}$ at 1× recording speed, exhibiting a practical error rate. The overwriting characteristics are CNR of 52.8 dB, and SbER of not higher than $2.3 \times 10^{-5}$ at 1× recording speed, exhibiting very satisfactory values.

This media showed an excellent recording characteristic at the record speed of 2× and 4×.

Comparative Example 1

Recording and reproducing by the conventional method are attempted for an optical recording media similar to that in Example 1. However, it is impossible to perform recording to a desired position of the L1 layer having a mirror substrate, resulting in failure to perform evaluations. Thus, it is impossible to put the single-sided, dual-layer or multi-layer media including three or more information layers into practical use under the conventional read/write scheme.

Comparative Example 2

The substrate for the L1 layer is a polycarbonate (PC) substrate prepared by injection molding and having a thickness of about 1.1 mm on which grooves are formed at a pitch of 0.68 μm. In performing land/groove recording, the track pitch corresponds to 0.38 μm. The L1 layer is prepared by depositing, on that surface of the PC substrate on which grooves are formed, a thick reflection film made of an Ag alloy, a dielectric film made of ZnS:SiO$_2$, an interface film made of GeN, a phase-change recording film made of GeSbTeBi, another interface film made of GeN, and another dielectric film made of ZnS:SiO$_2$ with a sputtering apparatus.

The L1 layer is spin-coated with a liquid photopolymer in a thickness of about 20 μm to form an interlayer separating layer. Grooves are transferred onto the interlayer separating layer by using a plastic stamper at a track pitch substantially equal to that in the L1 layer, followed by stripping the plastic stamper. The L0 layer is prepared by depositing, on the interlayer separating layer, a dielectric film made of ZnS:SiO$_2$, a translucent reflective film made of an Ag alloy, another dielectric film made of ZnS:SiO$_2$, an interface film made of GeN, a phase-change recording film made of GeSbTe, another interface film made of GeN, and still another dielectric film made of ZnS:SiO$_2$ with a sputtering apparatus. A substantially flat PC substrate without grooves and having a thickness of about 0.58 mm is bonded to the light incident side of the L0 layer.

The film construction is designed such that the L0 layer exhibits 52% of an average transmittance for a light beam with a wavelength of 405 nm and each phase-change recording film of the L0 layer and the L1 layer exhibits a reflectance of 5% on the crystallized portions. The recording film included in each information layer is crystallized over the entire surface of the media with an initializing apparatus. The optical recording media is designed to be reproduced based on reflectance difference both in the L0 layer and in the L1 layer. The optical recording media is evaluated as in Example 1.

The results of evaluations of the optical recording media are as follows, which are also shown in Table 1. The initial characteristics are CNR of 49.8 dB, X-E of 0.4 dB, and SbER of not higher than $4.5 \times 10^{-5}$, which are somewhat insufficient for the practical use. The overwriting characteristics are CNR of 47.7 dB, and SbER of about $6.1 \times 10^{-4}$. It is found that the overwriting characteristics are markedly deteriorated from the initial characteristics, resulting in failure to provide satisfactory characteristics.

TABLE 1

|  | Initial characteristics | | | Overwriting (OW) characteristics | |
| --- | --- | --- | --- | --- | --- |
|  | CNR[dB] | X-E[dB] | SbER | CNR[dB] | SbER |
| Example 1 | 53.2 | 0.2 | $<2.0 \times 10^{-5}$ | 52.7 | $<2.9 \times 10^{-5}$ |
| Example 2 | 54.3 | 0.1 | $<2.2 \times 10^{-5}$ | 53.8 | $<2.8 \times 10^{-5}$ |
| Example 3 | 52.9 | 0.2 | $<3.4 \times 10^{-5}$ | 51.9 | $<3.2 \times 10^{-5}$ |
| Example 4 | 52.1 | 0.2 | $<3.9 \times 10^{-5}$ | 51.7 | $<4.5 \times 10^{-5}$ |
| Example 5 | 53.5 | 0.1 | $<2.0 \times 10^{-5}$ | 53.1 | $<2.8 \times 10^{-5}$ |
| Example 6 | 53.4 | 0.2 | $<2.3 \times 10^{-5}$ | 52.9 | $<2.8 \times 10^{-5}$ |
| Example 7 | 52.9 | 0 | $<3.2 \times 10^{-5}$ | 51.5 | $<3.7 \times 10^{-5}$ |
| Example 8 | 53.6 | 0.1 | $<2.0 \times 10^{-5}$ | 52.8 | $<2.3 \times 10^{-5}$ |
| Comparative Example 1 | not evaluated | not evaluated | not evaluated | not evaluated | not evaluated |
| Comparative Example 2 | 49.8 | 0.4 | $4.5 \times 10^{-4}$ | 47.7 | $6.1 \times 10^{-4}$ |

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical recording media, comprising:
two or more information layers, at least one of the information layers comprising a writable recording film, at least one information layer having protrusions and recesses that permit tracking and at least another one information layer being substantially flat
wherein the writable recording film is formed of a material represented by the general formula:

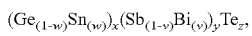

where x+y+z=100, 0≦w<0.5 and 0≦v<1.0.

2. An optical recording-reproducing apparatus recording to and reproducing from an optical recording media comprising two or more information layers, at least one of the information layers comprising a writable recording film, at least one information layer having protrusions and recesses that permit tracking and at least another one information layer being substantially flat, wherein the writable recording film is formed of a material represented by the general formula:

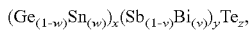

where x+y+z=100, 0≦w<0.5 and 0≦v <1.0,
the apparatus comprising:
a light source;
a polarization beam splitter, through which a light beam emitted from the light source is applied to the recording films included in the two or more information layers, splitting light beams reflected from the recording films included in the information layers based on difference in a polarized wave component of the reflected light beams; and
a photodetector detecting the light beam split by the polarization beam splitter.

3. The optical recording-reproducing apparatus according to claim 2, said optical media further comprising one or more interlayer separating layers provided between adjacent information layers.

4. The optical recording-reproducing apparatus according to claim 3, wherein each interlayer separating layer is substantially flat.

5. The optical recording-reproducing apparatus according to claim 2, wherein each of the two or more information layers includes a first dielectric film, a phase-change optical recording film, a second dielectric film, and a reflective film.

6. The optical recording-reproducing apparatus according to claim 2, wherein each of the two or more information layers includes a first dielectric film, a first interface film, a phase-change optical recording film, a second interface film, a second dielectric film, and a reflective film.

7. The apparatus according to claim 2, wherein tracking in the information layer which is substantially flat included in the optical recording media is performed based on protrusions and recesses of the another information layer included in the optical recording media.

8. The apparatus according to claim 2, wherein, for the optical recording media in which two or more information layers include a phase-change optical recording film, the recording films included in the two or more information layers are reproduced based on reflectance difference between a non-recording portion and a recording mark, respectively.

9. The apparatus according to claim 2, wherein, for the optical recording media in which two or more information layers include a phase-change optical recording film, the recording films included in the two or more information layers are reproduced with different reproducing schemes based on any one of reflectance difference and phase difference between a non-recording portion and a recording mark, respectively.

* * * * *